United States Patent

[11] 3,604,791

| [72] | Inventor | Vasile Baltatu<br>Bucharest, Romania |
|---|---|---|
| [21] | Appl. No. | 669,474 |
| [22] | Filed | Sept. 21, 1967 |
| [45] | Patented | Sept. 14, 1971 |
| [73] | Assignee | Comitetul De Stat Pentru Cultura Si Arta<br>Bucharest, Romania |
| [32] | Priority | Sept. 24, 1966 |
| [33] | | Romania |
| [31] | | 52,226 |

[54] SYSTEM (PROCESS) AND DEVICE FOR FILMING AND PROJECTION OF CINEMA FILM FOR VARIABLE SCREEN
17 Claims, 5 Drawing Figs.

[52] U.S. Cl............................................................ 352/40,
  350/117, 352/48, 352/85, 352/91, 353/79, 355/43
[51] Int. Cl........................................................G03b 21/32
[50] Field of Search............................................ 352/40, 43,
  48, 71, 85, 91

[56] References Cited
UNITED STATES PATENTS

| 3,199,404 | 8/1965 | Bragg et al. .................. | 355/42 |
| 3,490,844 | 1/1970 | Sapp, Jr. ..................... | 355/40 |
| 2,737,081 | 3/1956 | Dowling ....................... | 352/85 |
| 2,975,670 | 3/1961 | Hemstreet..................... | 352/40 X |
| 3,428,393 | 2/1969 | Montebellow................. | 352/85 X |

Primary Examiner—Samuel S. Matthews
Assistant Examiner—Richard A. Wintercorn
Attorney—Spencer & Kaye ABSTRACT: A method and apparatus for producing motion pictures which are elongated either horizontally or vertically to suit the artistic requirements of particular scenes. In addition to the normally horizontally elongated images, extra-wide images may be projected if desired. A motion picture camera is provided for making a cinema film in which horizontally elongated picture frames on the strip may carry either horizontally elongated images or vertically elongated images. These images may be anamorphosed. The result is a filmstrip having these images on it, along with the vertical images and deanamorphosed the anamorphosed images. The projector exhibits the images on a motion picture screen which has an inverted T-shape.

PATENTED SEP 14 1971
3,604,791
SHEET 1 OF 2
FIG. 1
FIG. 2
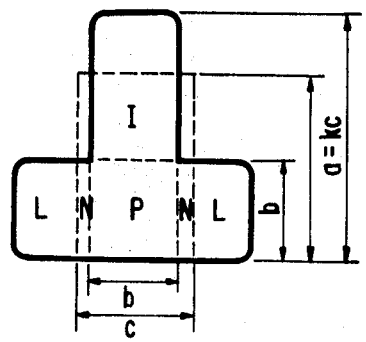
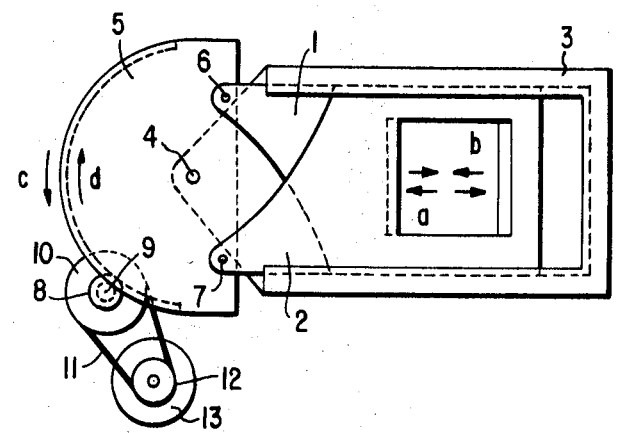
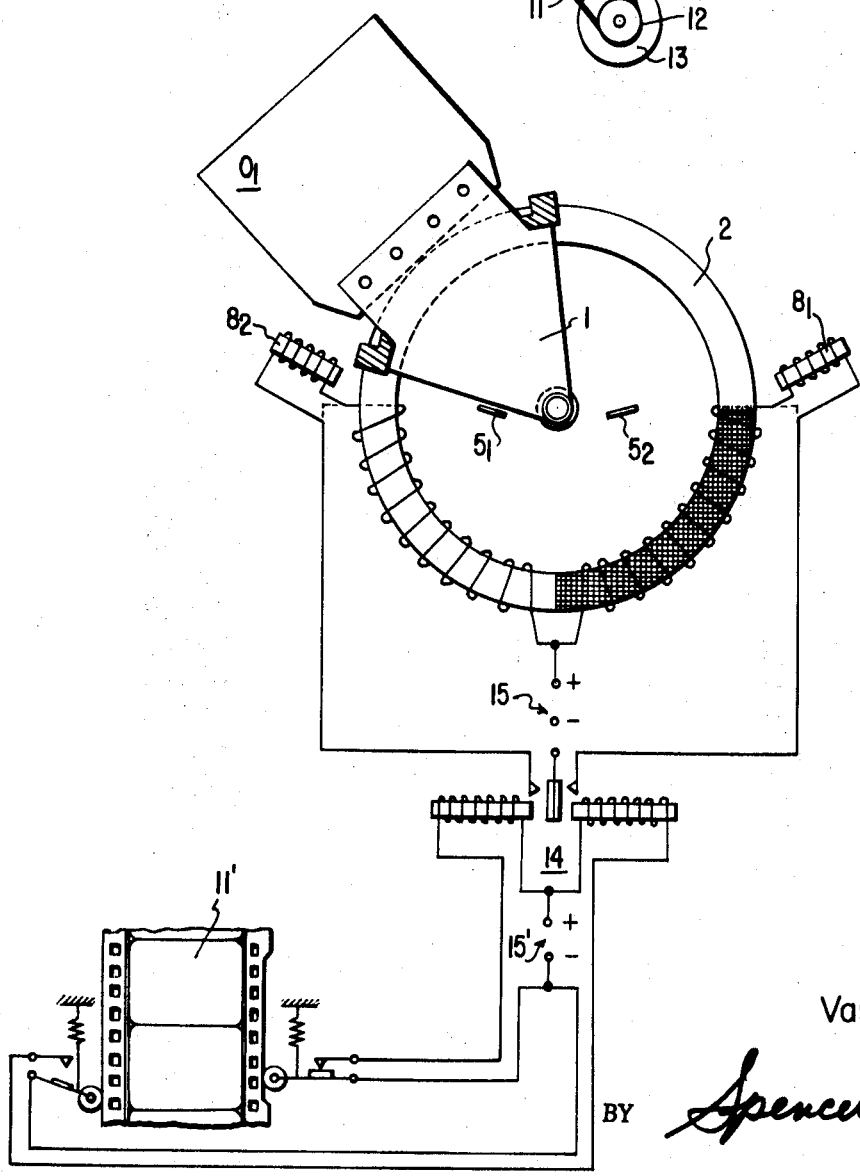
FIG. 4
INVENTOR
Vasile Baltatu
BY *Spencer & Kaye*
ATTORNEYS.

INVENTOR
Vasile Baltatu

BY Spencer & Kaye

ATTORNEYS

SYSTEM (PROCESS) AND DEVICE FOR FILMING AND PROJECTION OF CINEMA FILM FOR VARIABLE SCREEN

BACKGROUND OF THE INVENTION

This invention relates to motion picture production, and more particularly to a motion picture production method and apparatus in which either horizontally elongated or vertically elongated images can be produced to suit the artistic requirements of the situation.

Conventional motion-picture systems involve projection of images having a greater width than height. In some cases wide screen images having a greater than normal width have been utilized. However, for a full-length film, greater variations of the shapes of projected pictures may be desirable since an over-use of any one effect can be monotonous.

Among the objects of the present invention is the provision of a motion picture system in which greater variations of projected image-size and shape are available in order to provide the motion picture producer with additional effects suitable for particular dramatic purposes.

A further object of the invention is the provision of a motion picture production system in which images may be gradually varied in size, either imperceptibly or suddenly.

A still further object of the invention is the production of a film suitable for use with such a system, and the provision of apparatus for making such a film or for projecting such a film.

Briefly stated these and other objects of the invention are accomplished by the provision of a method in which either horizontally elongated images or vertically elongated images are projected upon a screen which may have the shape of an inverted T. Films are made with a camera which can alter the vertically elongated images so as to place them on horizontally elongated picture frames on a filmstrip, either by a process of rotating vertically elongated images, or by a process of anamorphosing the images so as to compress a vertically elongated image onto a horizontally extending picture frame, or by a combination of anamorphosation and rotation. In addition, a projector is provided which can deanamorphose or rotate such images as is required. This process is controlled by indicia recorded on the film either in the form of cutout portions, or magnetic indicia. To permit imperceptable variations from images of one shape to those of another shape picture frames may be formed which have darkened areas and picture-bearing areas. The size of the darkened areas relative to the picture-bearing areas may vary in steps on successive frames. A frame-limiting masking device for producing such picture frames having darkened areas which successively vary in size may be provided for use either with the motion picture camera which produces the film, or with a printing device which produces a finished film for production from a previously prepared film which does not contain such darkened areas. Images of three different basic types may be projected as desired: (a) vertically elongated images, (b) normal images having a width greater than their height, and (c) horizontally elongated images having a width: height ratio which is greater than the width:height ratio of the normal images.

The horizontally elongated wide screen is useful for general scenes expressing stability, quietness, calm or for scenery suggesting immensity or deepness, and for scenes involving a horizontal movement of a subject of interest on a screen.

The normal size is useful for closeup shots and for significant details. In most cases it does not offer sufficient emotional force.

The vertically elongated images are useful for scenes expressing tension, and in which a vertical movement of a subject of interest is to be emphasized, as well as for scenery intended to emphasize high features.

BRIEF DESCRIPTION OF THE DRAWINGS

FIG. 1 is a front elevation view of a projection screen according to the present invention.

FIG. 2 is a side elevation view showing a masking device which may be used in forming the variable-sized photograms according to the present invention.

FIG. 4 is a schematic view showing film indicia controlled projector apparatus according to the present invention.

DESCRIPTION OF PREFERRED EMBODIMENTS

Projection Screen, Images Projected, and Film

Figure 5:
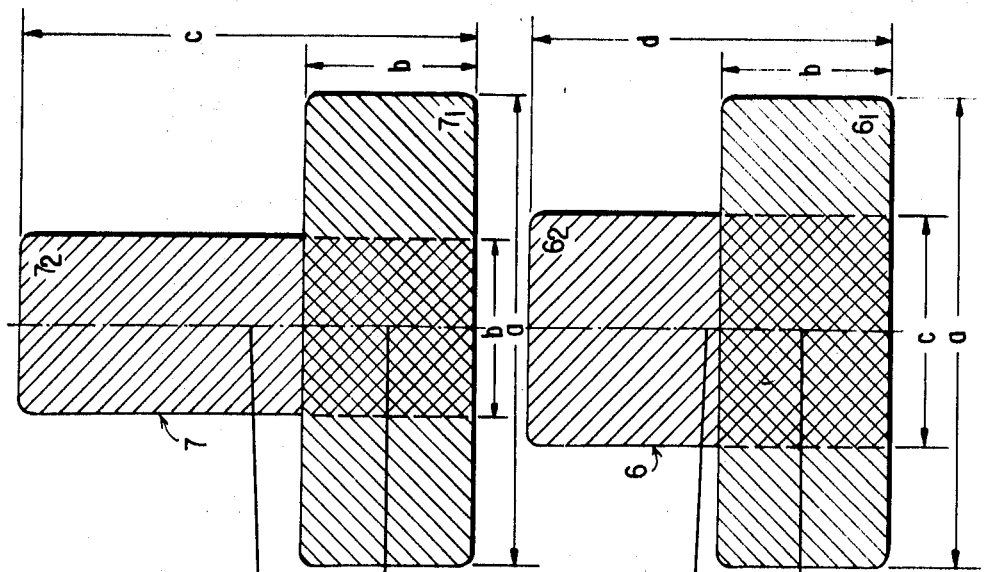
FIG. 5 is a schematic side elevation cross-sectional view similar to FIG. 3 showing a variation of a projector according to the present invention.

Referring now to the drawings, FIG. 1, there is illustrated a projection screen having the general shape of an inverted T. The crossbar portion of the T is of generally rectangular shape and has a height $b$. The leg portion extends upwardly from the center of the crossbar portion and has a width $b$ which is approximately equal to the height of the crossbar portion. It has a height $a$.

The crossbar portion of the T can be regarded as subdivided into several sections by imaginary lines, which are shown as dotted lines in FIG. 1. A central section P occupies the crossbar area which is common to both the crossbar and the leg. Two regions N are located on each side of region P to form an area having a width $c$ upon which normal size picture images will be projected. Two regions L are located outwardly on each side of the regions N and constitute the remainder of the crossbar portion.

If desired, the screen may be curved in a horizontal plane so as to be concave forwardly.

An inverted T-shaped screen may be formed by adding an upper section to existing wide curved screens in present theaters above its central middle section. In open-air theaters screens of inverted T-shape of large size can be easily built.

Cameras and Projectors

In general, the cameras and projectors work on similar optical principles and use similar apparatus. The image-rotating anamorphosing devices used with the cameras are reversed in their operation with projectors so as to restore previously rotated and compressed images to their original proportions and orientations.

These devices have a common principle of operation requiring optical rotation of image-forming rays by 90° under selective conditions.

Masking Devices

Example 1. As illustrated in FIG. 2 a mechanically actuated device may be also provided for use in masking the picture frames during either filming or copying. A pair of masks 1 and 2 are arranged for parallel sliding movement in a frame 3, when those $a$ and $b$ are cut in the frame. A pin 4 is fixed to one end of the frame perpendicular to masks 1 and 2. A toothed-gear segment 5 is mounted on this pin. The masks 1 and 2 have prolongations 6 and 7 respectively which are articulated to segment 5 to move therewith. A pinion 8 is mounted to rotate segment 5. This pinion is rotated by a belt of cable wheel 10. A cable 11 rotates the wheel and is itself moved by another wheel 12 driven by a motor 13. Rotation of the segment 5 in the counterclockwise direction shown by the arrow $c$ widens the gap and enlarges the field to allow transition from the normal size images N to wide images L. Rotation of segment 5 in he clockwise direction shown by arrow $d$ narrows the gap and reduces images from the wide size L to the normal size N. If desired this motion could continue until the picture frame was completely darkened.

By blocking or suppressing movement of one of the masks the limiter may be used for masking vertical frames also.

Film Indicia Controlled Projectors

Example 2. An alternative electromagnetic structure for rotating a movable mirror $O_1$ is disclosed in FIG. 4. This device utilizes a tubular ring coil 2 which is controlled by an electrical arrangement. The numerals 15 and 15' designate voltage sources. The two relay coils of a double-acting relay switch 14 are controlled by cam followers engaging slots on opposite edges of a filmstrip 11'. The ring is fastened to a segmental piece 1 mounted for rotation on a shaft 5 which is coaxial with the ring. A movable mirror $O_1$ is fixed to the segment 1 outwardly of the ring. The numerals $8_1$ and $8_2$ designate braking electromagnets, each associated with a respective side of coil 2. Stops $5_1$ and $5_2$ are arranged to engage the segment on opposite sides and to limit the rotation of the mirror to 90°.

Example 3. FIG. 5 illustrates, in longitudinal vertical section, the anamorphosing and rotating attachments. In front of the lens 2 and in its optical axis is placed an optical assembly which includes an anamorphotic lens 3 arranged to horizontally expand a compressed image from a picture frame to thereby deanamorphose images. The optical assembly includes a box 4 which has a movable mirror $O_1$ and fixed mirrors $O_2$ and $O_3$. Mirror $O_1$ is mounted on a tubular ring of the type disclosed in Example 2. The mirror $O_2$ is connected in position to raise the base of the vertical frames so as to be aligned with the bottom of a projection screen. When the movable mirror $O_1$ is moved into active position a previously deanamorphosed image is first horizontally expanded, and is then rotated through 90° by the mirror arrangement. With this arrangement no rotation of the anamorphotic lens 3 is required. The optical assembly contained in the box 4 could also be used with a motion picture camera instead of a projector and in this case, if desired, a frame limiter of the type discussed under Example 1 could be utilized with the assembly.

Figure 3:
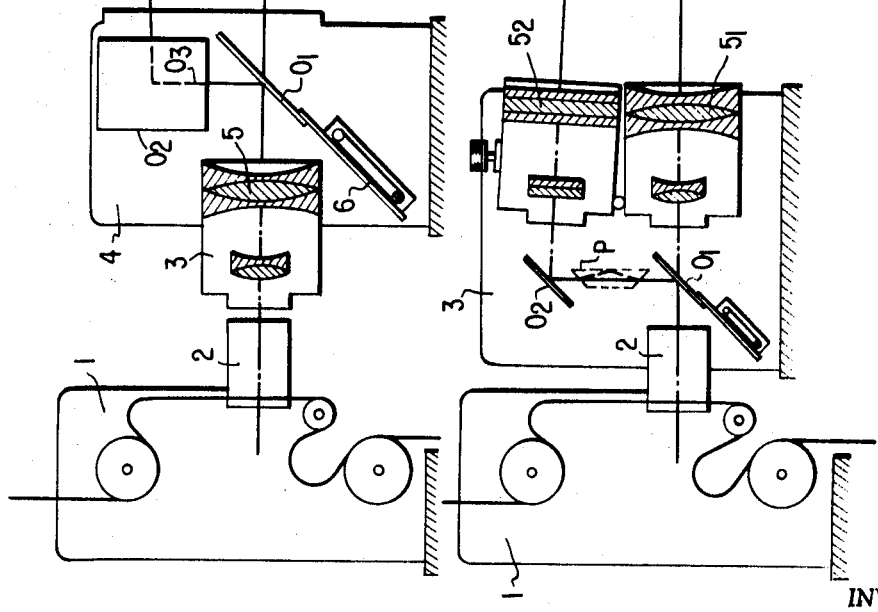
FIG. 3 is a schematic side elevation, cross-sectional view of a projector according to the present invention.

Example 4. Another type of optical assembly which can be mounted on the front of the existing projector is illustrated in FIG. 3. The device is mounted in a box 3 which is placed on the front of the projecting lens 2 of the projector. A movable mirror $O_1$ energized by a tubular ring of the type discussed with respect to Example 2 is mounted for selective movement into the optical path. A correcting mirror $O_2$ and a Wollaston Prism P is also mounted in the box. The Prism P is arranged so that it may be selectively removed if so desired. When used as a projector for films of the type covering area If in FIG. 1 the prism is removed since image rotation by 90° is not then necessary and only displacement of the vertically elongated image is desired. An upper anamorphotic lens $5_2$ is provided in the optical path of the light rays reflected from the upper mirror $O_2$. This anamorphotic lens is arranged to vertically expand picture frames. However, by insertion of the Prism P a picture frame in which vertically elongated images extend transversely across the strip can be projected. In that case, the optical assembly including the mirror $O_1$, the Prism P, and the mirror $O_2$ rotates the image by 90°, and thereafter the anamorphotic lens vertically expands it.

This system permits projection of images having dimensions $c \times d$ as shown in FIG. 3.

This system also permits the use of an anamorphotic lens $5_2$ which has a vertical expansion factor $k$ which is different from the horizontal factor of the anamorphotic lens $5_1$.

This optical assembly can also be used as an adjunct to a motion picture camera. In that case, a small masking device of the type described with respect to Example 1 above, might be used with the assembly in addition.

It is also possible for horizontal and vertical frames filmed by the system here described to be formed on two separate films which are projected with two different projectors, provided with appropriate devices according to this invention and connected to each other. It will be apparent that the system permits the formation of three basic size projected images; wide, normal, and high. In addition intermediate sizes may be obtained which are either horizontally or vertically elongated. Progressive transition from one size to another, either slowing or quickly can be performed.

In addition the invention can be practiced with simple optical accessories including an anamorphotic lens, a frame limiter and an image inverter and a corrector of the vertical frame base which may be used with existing cameras and projectors. Generally the devices may be manually actuated in filming, but during projection they are actuated by small and simple mechanical devices.

The system may be used for films of various widths.

It will be understood that the above description of the present invention is susceptible to various modifications, changes and adaptations.

I claim:

1. A method of producing a motion picture film comprising the steps of, in combination:
   a. directing light onto a motion picture film to produce a plurality of images, each on a respective picture frame; and
   b. masking the light so directed to produce at least some picture frames having differently proportioned images of varying sizes and recording adjacent each image an indication of one of a number of preselected categories into which that image falls.

2. A method of producing a motion picture film comprising the steps of, in combination:
   a. directing light onto a motion picture film to produce a plurality of images on separate picture frames;
   b. masking the light so directed to produce at least some picture frames having images of a reduced size, and recording adjacent each image an indication of one of a number of preselected categories of size into which that image falls; and
   c. projecting horizontally elongated images onto the crossbar portion of an inverted T-shaped screen, and projecting vertically elongated images onto the leg portion of the same T-shaped screen.

3. The method of claim 2 including the steps of:
   a. forming images of vertically elongated scenes,
   b. optically rearranging said images to fit within horizontally elongated picture frames on a film within a motion picture camera,
   c. forming permanent images of said vertically elongated scenes on the horizontally elongated picture frames of a motion picture film,
   d. progressively reducing the size of the image formed on successive picture frames on said film to form permanent images on the frames including the darkened areas and picture bearing areas in which successive picture frames carry picture bearing areas of varying width: height ratios extending from the width: height ratio of a vertically elongated image to those of a horizontally elongated image, and
   e. projecting said picture frames onto the same inverted T-shaped screen to produce a motion picture having a gradual variation between the proportions of horizontally elongated images and vertically elongated images.

4. The method of claim 3 including the step of anamorphosing at least some images of said scenes, thereafter forming permanent images of said anamorphosed scenes on filmstrip, and deanamorphosing said images during the projection process.

5. The method of claim 4 including the step of rotating said anamorphosed images with a mirror prior to the formation of permanent images on the picture film to thereby form compressed images of vertically elongated scenes on horizontally elongated picture frames.

6. A method for recording and exhibiting motion picture images formed by horizontal and vertical anamorphosing and delimiting the frame to obtain images which may be projected in variable sizes by deanamorphosing, the sizes being wide, normal, high and intermediate, the images being in succession and in any desired order, projected onto an inverted T-shaped screen, comprising the steps of:

a. forming wide images on respective frames of a motion picture film by anamorphosing in the horizontal direction;
b. forming high images by anamorphosing in the vertical direction through an anamorphotic lens rotated 90° from its position for anamorphosing in the horizontal direction;
c. forming intermediate images by using a variable frame limiter actuated simultaneously with a zoom;
d. projecting wide images onto the inverted T-shaped screen by deanamorphosing in the horizontal direction; and
e. projecting high images onto the inverted T-shaped screen by deanamorphosing in the vertical direction.

7. The method according to claim 6, wherein step e is carried out by deanamorphosing in the vertical direction through a supplementary anamorphotic lens rotated 90° from its normal position for the horizontal direction, and through an optical device having a movable mirror which is actuated by an electromechanical device.

8. The method according to claim 6, wherein step e is carried out by the step of using an automatic device wherein the anamorphotic lens is rotated through 90° simultaneously with the actuation of a correction mirror provided for the vertical image position.

9. The method according to claim 6, wherein steps d and e are carried out by the step of projecting successively high and wide images by means of two independent projection apparatuses.

10. The method according to claim 6, wherein step e is carried out by the step of projecting and forming very high images by using an image rotating device provided with three mirrors for rotating the image from the vertical to the horizontal when forming it, and conversely when projecting it.

11. The method according to claim 6, further including the step of forming the inverted T-shaped screen by adding a member to the central upper portion of a normal wide screen to permit the projection of images in the basic sizes; wide, normal and high, and in sizes intermediate thereto.

12. The method of claim 6, wherein the step of using variable frame limiter simultaneously with a zoom coupled to limiter further includes the step of using a limiter equipped two masks, and the step of blocking one of the masks when form the high images.

13. The method according to claim 6, further including the steps of successively deanamorphosing images in the horizontal and vertical directions by using two fixed anamorphotic lenses and directing the image to the desired lens by means of two mirrors, one of which is suitably inclined to correct the position of the vertical images and the other a movable mirror which is actuated by means of a semicircular electromagnet with two coils and an iron core which can be placed in one of two different positions in dependence on signals received from the film.

14. The method according to claim 6, further including the step of projecting the vertical images by means of an anamorphotic lens which is rotated 90° from its normal position simultaneously with actuating a mirror for correcting the position of the vertical images.

15. The method according to claim 6, further including forming images by the steps of rotating the natural image and then anamorphorizing it, these steps being carried out by an image rotation device provided with three plane mirrors, one of the mirrors being movably mounted and one inclined, so that during projecting steps the base lines of the vertical frames will be projected along the same line as the base lines of the horizontal frames.

16. The method according to claim 15, further including the step of using cylindrical mirrors in the image rotation device to simultaneously anamorphosize and rotate images.

17. A motion picture projection screen comprising, in combination: a lower flat member having a generally rectangular shape, the width of which is greater than the height, and a central flat member forming a generally rectangular surface extending upwardly from said lower screen member to form an inverted T-shaped screen on which horizontally elongated images may be projected on the lower member, and vertically elongated images may be projected on the central member and the region of the lower member immediately below it.